(12) United States Patent
Khalil et al.

(10) Patent No.: US 8,588,741 B1
(45) Date of Patent: Nov. 19, 2013

(54) USING EAP INSTEAD OF PPP FOR AUTHENTICATION

(75) Inventors: Mohamed Khalil, Murphy, TX (US); Haseeb Akhtar, Garland, TX (US)

(73) Assignee: Microsoft Corporation, Redmond, WA (US)

( * ) Notice: Subject to any disclaimer, the term of this patent is extended or adjusted under 35 U.S.C. 154(b) by 651 days.

(21) Appl. No.: 11/529,794

(22) Filed: Sep. 29, 2006

Related U.S. Application Data

(60) Provisional application No. 60/728,682, filed on Oct. 20, 2005.

(51) Int. Cl.
*G06F 17/30* (2006.01)
*H04M 1/66* (2006.01)

(52) U.S. Cl.
USPC ............................. 455/411; 726/27; 455/410

(58) Field of Classification Search
USPC ................... 726/27; 455/410, 411
See application file for complete search history.

(56) References Cited

U.S. PATENT DOCUMENTS

| 2004/0114553 A1* | 6/2004 | Jiang et al. ............... 370/328 |
| 2004/0133806 A1* | 7/2004 | Joong et al. ............... 713/201 |

OTHER PUBLICATIONS

3GPP2 Technical Specification S0001-A-1, published 2000, p. 11.*
RFC3588 Diameter Protocol, published Sep. 2003, p. 6.*

* cited by examiner

*Primary Examiner* — Rafael Pérez-Gutiérrez
*Assistant Examiner* — Joshua Schwartz
(74) *Attorney, Agent, or Firm* — Wolfe-SBMC

(57) ABSTRACT

Various embodiments are described for Point-to-Point Protocol-free (PPP-free) access and service authentication in a wireless network. An HRPD connection/session is established between an access terminal and the access network. Instead of setting up a PPP session and performing access (i.e., device access) authentication and service authentication using PPP, the Extensible Authentication Protocol (EAP) is utilized.

16 Claims, 4 Drawing Sheets

USING EAP INSTEAD OF PPP FOR AUTHENTICATION

CROSS-REFERENCE TO RELATED APPLICATION

This application claims priority under 35 USC 119(e) to U.S. provisional Application Ser. No. 60/728,682, filed on Oct. 20, 2005, and which is incorporated herein by reference.

TECHNICAL FIELD

The present invention relates generally to wireless communication systems, and more particularly to a method and system for access terminal (AT) access authentication and service authentication processes in a wireless communication system.

BACKGROUND

Current wireless broadband data communications systems provide high bandwidth necessary for delivering high data rates (and high quality voice, such as VOIP) for both fixed and mobile applications. Such systems may operate in conformance with the High Rate Packet Data (HRPD) protocol or specification. Existing HRPD systems function in accordance with interface standards developed by 3GPP2/TIA (3rd Generation Partnership Project 2/Telecommunications Industry Association, namely the HRPD Interoperablility Specification (IOS) (3GPP2 A.S0007-A v.2.0 May 2003), which is incorporated herein by reference. HRPD systems typically employ air interfaces in accordance with TIA-856, while their network architectures are structured according to either the TIA-878 or the TIA-1878 specifications, also incorporated herein by reference.

Once the HRPD connection is established between an access terminal (AT) and the access network (AN), one or more Point-to-Point protocol (PPP) sessions are also established. The PPP is utilized over the HRPD for both access authentication and service authentication. One problem with using PPP is that PPP is relatively inefficient within a wireless environment. PPP has a long setup time and requires extra header framing. This results in significant added overhead to the call setup and an increase in latency over the bearer path. Moreover, PPP is not readily suitable for real-time applications.

Accordingly, there are needed methods and systems that eliminate utilization of PPP in access and service authentication processes in HRPD wireless communication systems.

SUMMARY

In accordance with one embodiment, a method is provided for performing an authentication process in a wireless network. The method includes receiving a wireless connection request from an access terminal and establishing a High Rate Packet Data (HRPD) connection between the access terminal and an access network. Authentication of the access terminal is performed using one or more methods in accordance with Extensible Authentication Protocol (EAP) over the HRPD connection.

In accordance with another embodiment of the present invention, there is provided a computer program embodied on a computer readable medium and operable to be executed by a processor within a communications device or system, the computer program comprising computer readable program code for performing the method described above. In yet another embodiment, an access network is provided with the means for performing the steps described above.

In accordance with yet another embodiment, a method is provided for performing an authentication process in a wireless network. The method includes receiving a wireless connection request from an access terminal and establishing a High Rate Packet Data (HRPD) connection between the access terminal and an access network. A request identity message is sent to the access terminal and a response identity message is received from the access terminal. One or more authentication methods are performed using one or more methods in accordance with Extensible Authentication Protocol (EAP) over the HRPD connection for authenticating the access terminal, and an authentication success message is sent to the access terminal.

In another embodiment, a method is provided in a wireless communications system, having a supplicant, an authenticator and an authentication device for authenticating the supplicant. The method includes receiving a wireless connection request from the supplicant and establishing a High Rate Packet Data (HRPD) connection between the supplicant and the authenticator. An Extensible Authentication Protocol (EAP) request identity message is sent to the supplicant over HRPD and an EAP response identity message is received from the supplicant over HRPD. One or more one or more authentication methods using one or more methods in accordance with EAP over HRPD and operable for authenticating the supplicant, and an EAP authentication success message is sent to the supplicant over HRPD.

Other technical features may be readily apparent to one skilled in the art from the following figures, descriptions, and claims.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION

Figure 1:
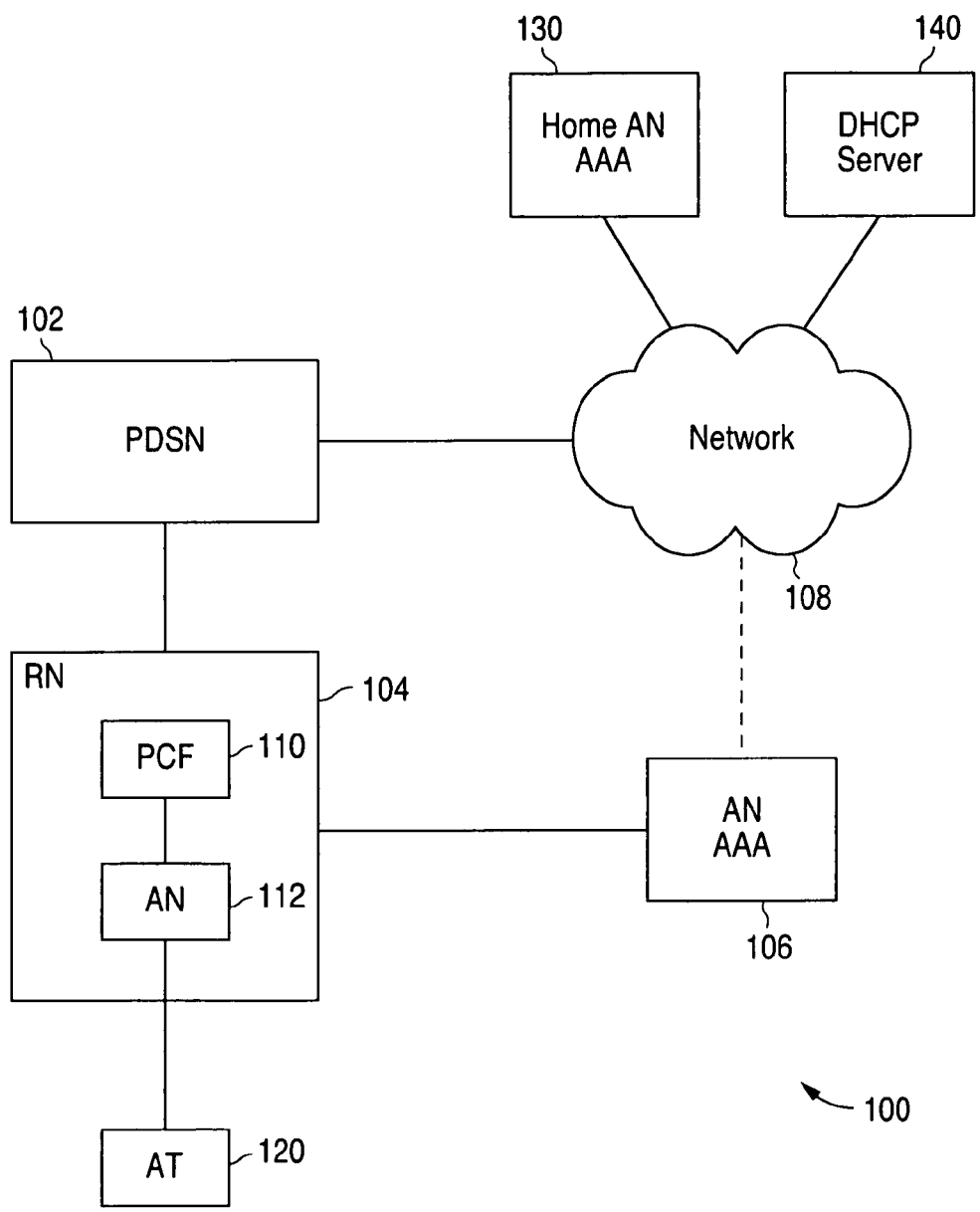
FIG. 1 depicts in block diagram form a wireless communications network in accordance with the present invention.

FIG. 1 illustrates an example communications network architecture or system 100 in accordance with the present invention. The system or network 100 shown in FIG. 1 is for illustration purposes only. Other embodiments of the system 100 may be used without departing from the scope of this disclosure.

In this example, the system 100 includes packet data serving node (PDSN) 102, a radio access network 104, an access network authorization, accounting and authentication device (AN-AAA) 106, a network 108, a home access network AAA device (Home AN-AAA) 130, and a Dynamic Host Configuration Protocol (DHCP) server 130. The radio access network 104 includes a packet control function (PCF) 110 and an access network (AN) 112. Though shown as a separate device, the AN-AAA 106 may form part of the radio network 104. In addition, the AN-AAA 106 may alternatively be communicatively coupled to the PDSN 102 or form a part of the PDSN 102. It will be understood that the radio access network 104 may also be configured to include various devices or configurations. The PDSN 102 provides a gateway function between the radio access network 104 and the network 108. The AN-AAA 106 may also be coupled to the network 108 directly or through other devices (such as the PDSN 102).

The network 108 may include one or more local area networks ("LAN"), metropolitan area networks ("MAN"), wide area networks ("WAN"), all or portions of a global network, or any other communication system or systems at one or more locations, or combination of these, including the public switched telephone network (PSTN), Internet, packet networks and the like. In one specific embodiment, the network 108 is an Internet Protocol (IP) based network.

The AN 112 has coupled thereto an access terminal (AT) 120. The AT 120 is operable for communicating wirelessly with the AN 112 over an air interface. Additional or fewer PDSNs, radio access networks, PCFs, ANs and ATs may be included in the system 100, with the ATs communicate with one or more ANs over wireless interfaces. Different configurations of system 100 may be utilized in accordance with the present invention (such as different TIA embodiments).

The structure and functionality of the PDSN 102, radio access network (sometimes referred to as RN) 104, access network 112 and PCF 110 are generally well-known. The PCF 110 may include components such as processing units and PCF network interfaces, while the AN 112 may include components such as controllers, selection and de-selection units (SDUs) to support macro-diversity, and access network transceiver systems (not shown). Such components may include, and are not limited to, microprocessors, microcontrollers, memory devices, and/or logic circuitry, and these may be adapted to implement various algorithms and/or protocols. No additional description of the conventional functionality and application of PDSN, RN, AN, PCF, and AN-AAAs, other than as noted herein or relevant for an understanding of the present invention, is provided, as these are known to those of ordinary skill in the art.

It will be understood that the PDSN 102, the radio access network 104, the AN-AAA 106, the PCF 110, the AN 112, the Home AN-AAA 130 and the DHCP server 140 may be constructed or configured from any suitable hardware, software, firmware, or combination thereof for providing the functionality known to those of ordinary skill in the art. These devices will include additional functionality as described below in accordance with one or more embodiments of the present invention.

The network 108, PDSN 102, RN 104, AN-AAA 106, PCF 110, AN 112, Home AN-AAA 130 and DHCP server 140 are interconnected via communications lines which may be wired or wireless, or any combination thereof. The system 100 may utilize any suitable protocol or protocols, and in a specific embodiment, the wireless network portion of the system 100 (e.g., communications link between AT 120 and RN 104 or AN 112) functions in accordance with the HRPD protocol. The PDSN 102 and RN 104 (and/or portions thereof) may also be collectively referred as an "access network." In other embodiments, an AN and its associated PCF may be referred to as an "access network."

Other components, devices or networks may be included in the system 100, and FIG. 1 only illustrates but one exemplary configuration to assist in describing the system and operation of the present invention to those skilled in the art. The system represented in FIG. 1 may be described using different nomenclature or system terminology, such as use of the terms mobile subscriber terminals (MS or MT) (an access terminal), base transceiver stations (BTS or BS) (a radio or access network or node), base station controllers (BSC), radion network controllers (RNC) and mobile switching centers (MSC), and the use of any given nomenclature to describe a device within the system 100 is not intended to limit the scope of this disclosure.

The access terminal or device 120 represents a device utilized by a user or subscriber during communication sessions over/within the system 100. For example, each of the communication devices may include an input/output device having a microphone and speaker to capture and play audio information. Optionally, the communication device 120 may also include a camera and/or a display to capture/display video information. During a communication session, the AT 120 communicates with one or more other devices coupled/connected to the network 108 (or within the system 100). In this way, the AT 120 may exchange audio, video, graphical, or other information during a communication session.

The access terminal 120 may be constructed or configured from any suitable hardware, software, firmware, or combination thereof for transmitting or receiving information over a network. As an example, the AT 120 could represent a telephone, videophone, computer, personal digital assistant, and the like, etc.

Figure 2:
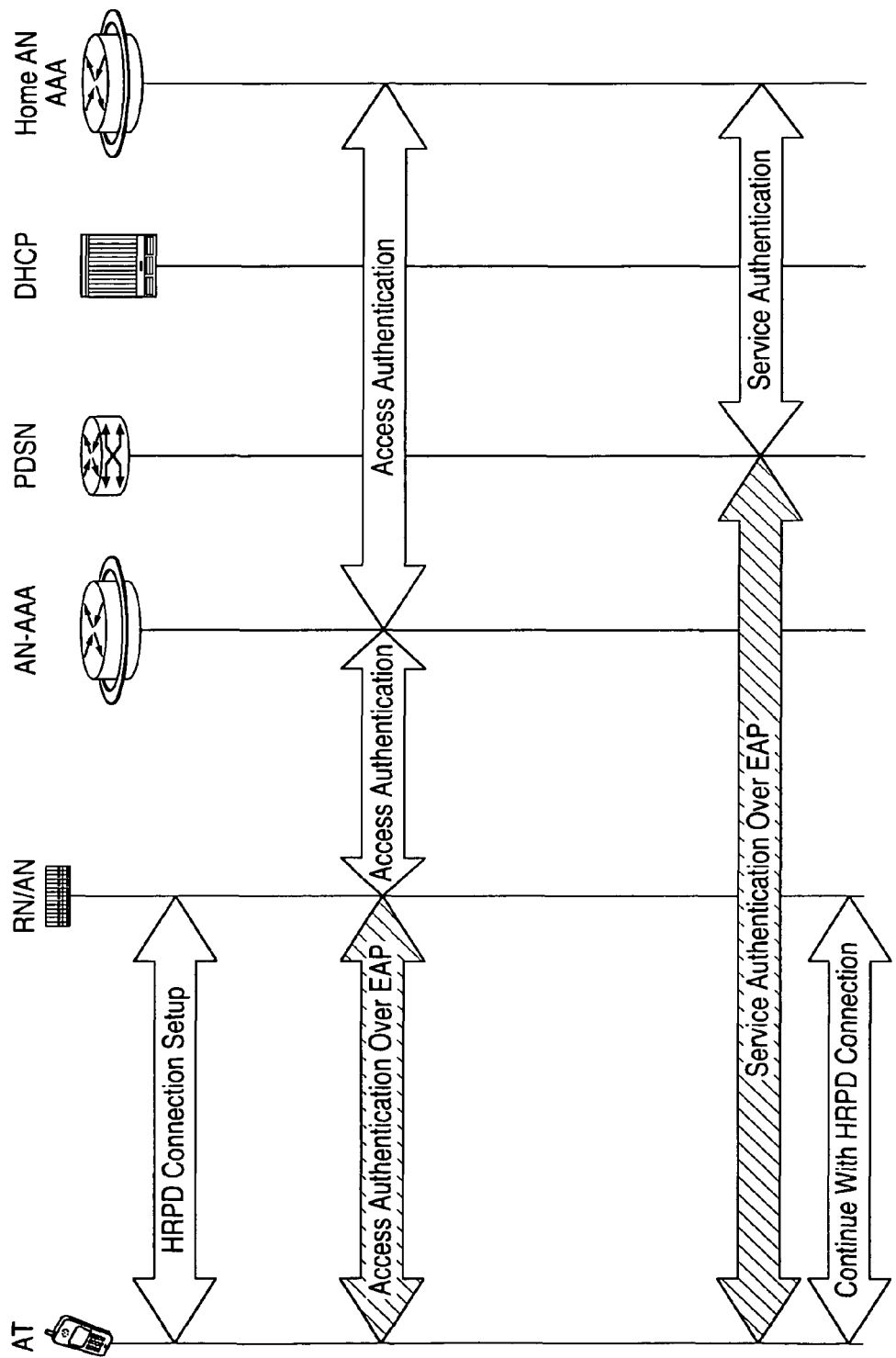
FIG. 2 depicts a general overview of a call or message flow or method for access and service authentication in accordance with the present invention.

Now referring to FIG. 2, there is shown an overview of a call, message flow or process illustrating access (device access) authentication and service authentication in the system 100. An HRPD connection and session are established between the AT 120 and the AN 112. Access authentication, sometimes referred to as device authentication, is performed using Extensible Authentication Protocol (EAP) messages exchanged or transmitted over the established HRPD connection between the AT 120 and the AN 112. The access authentication process typically includes additional communication exchanges between the AN 112 and the AN-AAA 106 and/or the Home AN-AAA 130. In the access authorization process, the access terminal 120 may also be referred to as a "supplicant," the access network 112 as an "authenticator" and the appropriate AN-AAA 106, 130 as an "authentication server."

It will be understood that access authentication and service authentication may be referred to individually or collectively as authentication of the access terminal. In the event that access authentication or service authentication is intended, those terms will be specifically used.

If the access terminal 120 is within its own "home" network then access authentication will involve the AN-AAA 106. If visiting, the access authentication will involve the access terminal's Home AN-AAA 130 (though the AN-AAA 106 might be initially queried and determine that the AT 120 is a visitor to the RN 104).

Once access authentication is successful and a connection is established between the AN 112 and the PDSN 102 (which usually involves the PCF 114), service authentication is performed using EAP messages exchanged or transmitted over the established HRPD connection between the AT 120 and the AN 112. The service authentication process typically includes additional communication exchanges between the AN 112, the PDSN 102 and the AN-AAA 106 and/or the Home AN-AAA 130. In the access authorization process, the PDSN 102 is referred to as the "authenticator." Again, the identity of the authenticator will depend on whether the AT 120 is visiting or within its home network.

Prior art wireless systems performed access and service authentication using the PPP protocol and PPP sessions. As described previously, PPP is relatively inefficient within a wireless environment and has a long setup time and requires about seven bytes of extra header framing. Authentication using PPP results in significant added overhead to the call setup and an increase in latency over the bearer path, and PPP is not readily suitable for real-time applications.

The present disclosure describes a PPP-free authentication method or process using EAP for access authentication and service authentication for a wireless access terminal in a radio access network. More specifically, the present disclosure describes using EAP over HRPD (between the AT 120 and RN 104 (or the AN 112)) for the access authentication and service authentication. In other words, EAP is used over a connection/session compliant with, or set up in accordance with, the HRPD protocol or specification. EAP may also be utilized over connections to/from the Home AN-AAA 130 within the access and/or service authentication processes or methods described. As will be appreciated, authentication may be performed within the system 100 using HRPD PPP-free access authentication and/or HRPD PPP-free service authentication. In one embodiment employing EAP authentication in HRPD PPP-free authentication, various methods of EAP authentication may be used (e.g., EAP-TLS (EAP for Transport Layer Security), LEAP (Lightweight Extensible Authentication Protocol), EAP-SIM (EAP for GSM Subscriber Identity), EAP-AKA (EAP for UMTS Authentication and Key Agreement), etc.).

Figure 3:
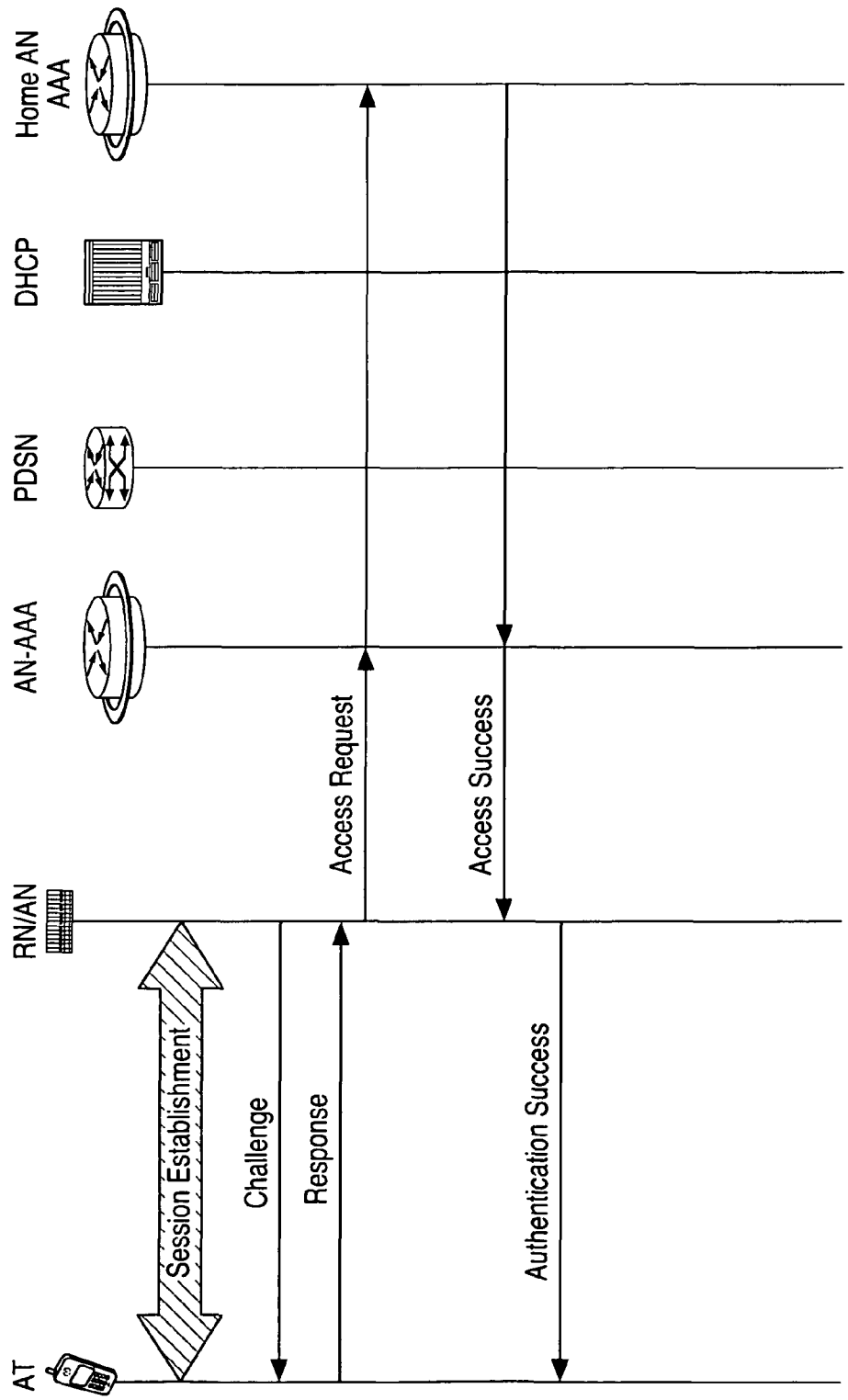
FIG. 3 is a more detailed diagram depicting a call or message flow or method for access authentication in accordance with the present invention.

Now referring to FIG. 3, there is shown more detailed diagram depicting a call, message flow or method for access authentication in accordance with one embodiment of the present invention. After establishment of an HRPD connection and session between the AT 120 and the AN 112 (or RN 104), the AN 112 sends an authentication challenge message to the AT 120 to query the identity of the AT 120 (or user). The AT 120 transmits an authentication response message to the AN 112 including information identifying the AT 120 (or user). This information is sent to the appropriate AN-AAA device 106, 130. If the AT 120 is within its home network, the identity information is sent to the AN-AAA 106 for authentication. When properly authenticated, the AN 112 transmits an authentication success message to the AT 120.

In the event the AT 120 is visiting, the identity information is forwarded to the Home AN-AAA 130. This may be accomplished in various ways, including having the AN-AAA 106 perform the forwarding or, if the AN-AAA 106 responds to the AN 112 that the AT is visiting, the AN 112 may forward the information to the Home AN-AAA 130. The message flow between the AN 112 (or AN-AAA 106) and the Home AN-AAA 130 may utilize the same or other message types or protocols (e.g., DIAMETER, RADIUS), including EAP over DIAMETER or EAP over RADIUS. This may also apply to a message flow occurring between the AN 112 and the AN-AAA 106 (e.g., A12/A13 signaling type as specified by 2GPP2 standard documents such as IS-878).

In one embodiment, the authentication challenge, authentication response and authentication success messages between the AT 120 and AN 112 are based on EAP, and more specifically, are EAP-Request/Identity, EAP-Response/Identity and EAP-Success messages, respectively. These are transmitted via the HRPD connection/session between the AT 120 and the AN 112. In the same or another embodiment, the access request message sent to the Home AN-AAA 130 includes an EAP-Response/Identity message over DIAMETER and the access response message from the Home AN-AAA 130 includes an EAP-Success message over DIAMETER.

Though not shown in FIG. 3, additional communication exchanges or messages may flow between these components depending on the type and extent of the authentication process. For example, if a key exchange system is used, various keys and other information may be exchanged during the authentication method process (e.g., EAP-AKA method).

Figure 4:
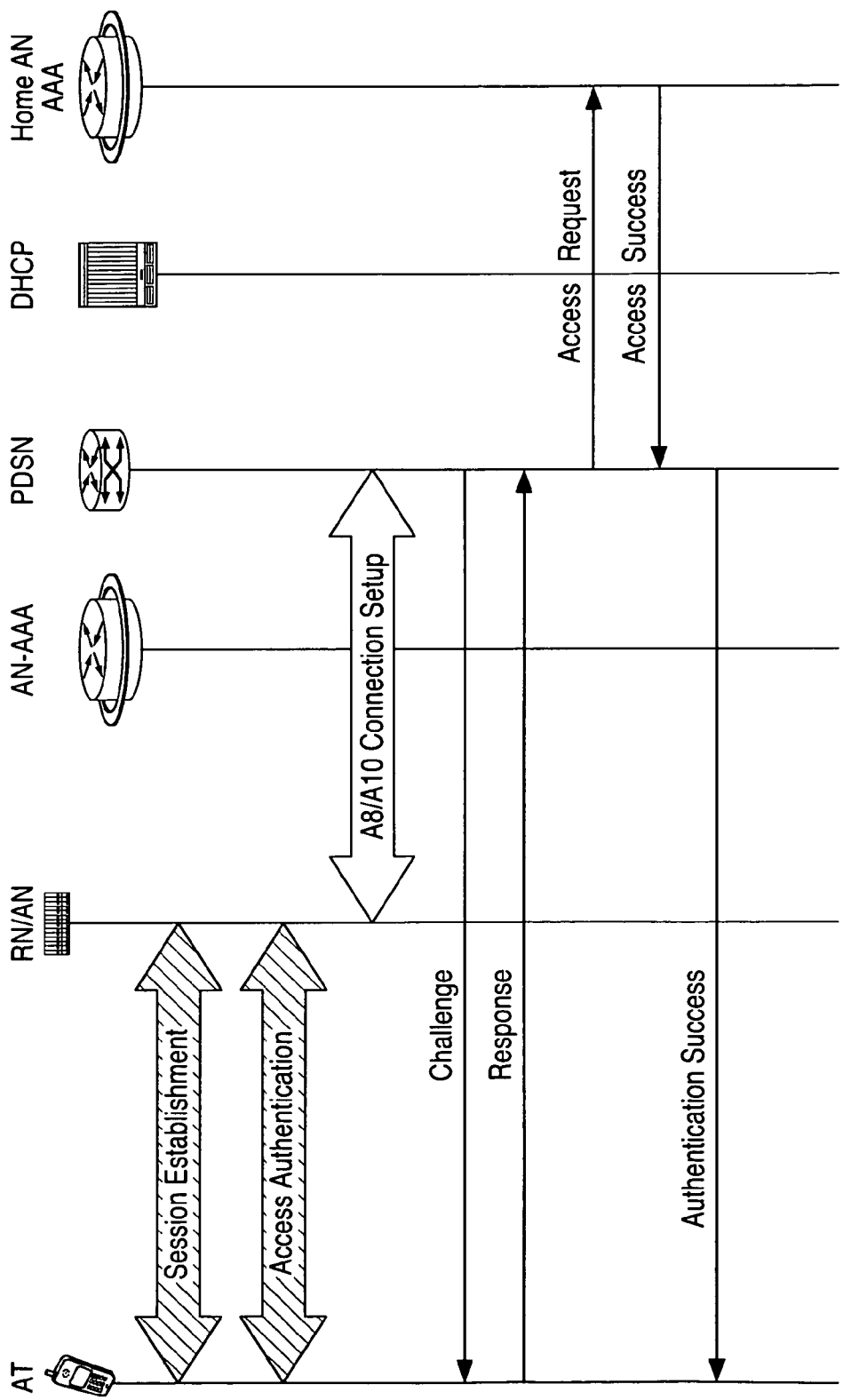
FIG. 4 is a more detailed diagram depicting call or message flow or method for service authentication in accordance with the present invention.

Now referring to FIG. 4, there is shown a more detailed diagram depicting a call, message flow or method for service authentication in accordance with one embodiment of the present invention. After establishment of both an HRPD connection and session between the AT 120 and the AN 112 (or RN 104) and successful access authentication, an A8/A10 connection is conventionally established (AN/PCF/PDSN).

The PDSN 102 sends an authentication challenge message to the AT 120 (via the PCF 114 and AN 112, not shown) to query the identity of the AT 120 (or user). The AT 120 transmits an authentication response message to the PDSN 102 (via the AN 112 and PCF 114, not shown) including information identifying the AT 120 (or user). Assuming the AT 120 is not in its home network, this information is sent to the Home AN-AAA 130 (if the AT 120 is within its home network, the identity information is sent to the AN-AAA 106 for authentication). When properly authenticated, the PDSN 102 transmits an authentication success message to the AT 120.

The message flow between the PDSN 102 and the Home AN-AAA 130 may utilize the same or other message types or protocols (e.g., DIAMETER, RADIUS), including EAP over DIAMETER or EAP over RADIUS. This may also apply to a message flow occurring between the AN 112 and the PDSN 102 (e.g., A10/A11 or R1/R11 signaling type).

In one embodiment, the authentication challenge, authentication response and authentication success messages between the AT 120 and PDSN (through the AN 112 and PCF 114) are based on EAP, and more specifically, are EAP-Request/Identity, EAP-Response/Identity and EAP-Success messages, respectively. These are transmitted via the HRPD connection/session between the AT 120 and the AN 112 (and via the A8 and A10 connections). In the same or another embodiment, the access request message sent to the Home AN-AAA 130 includes an EAP-Response/Identity message over DIAMETER and the access response message from the Home AN-AAA 130 includes an EAP-Success message over DIAMETER.

Though not shown in FIG. 4, additional communication exchanges or messages may flow between these components depending on the type and extent of the authentication process. For example, when a key exchange system is used, various keys and other information may be exchanged during the authentication method process (e.g., EAP-AKA method). In addition, various keys may be generated and exchanges may occur after service authentication is completed, such as establishing master session key and primary master key and exchanging keys.

In one embodiment, the Home AA-AAA 130 identifies the AT 120 (user/subscriber) profile and may detect the subscriber's roaming mode (e.g., Mobile IP, Simple IP, etc.) and assigns bootstrap information to the AT 120 (e.g., link prefix in a 3GPP2 vendor specific attribute) if the mode is Mobile IP (if Simple IP, no bootstrap information is used). The bootstrap information is sent to the PDSN 102 and stored (stored at the PDSN 102 and/or the DHCP server 120). This information may be useful for certain roaming versions and depending on the desired method of acquiring the IP address.

In Mobile IP version six (MIPv6) roaming, the IP address may be obtained pursuant to a stateless address auto-configuration process or a stateful address configuration process. In the stateless process, the AT 120 configures its IP address using information it obtains from a router advertisement (RA) (O bit set) sent from the PDSN 102 in response to a router solicitation (RS) initiated by the AT 120. The AT 120 requests bootstrap information by sending an information-request message (DHCP message) to the PDSN 102. The PDSN 102 looks up the appropriate record based on the client identifier and replies back to the AT 120 with the bootstrap information in a 3GPP2 vendor specific option (within an information-reply message). In the stateful process, the AT 120 configures its IP address using the DHCP server 120 (DHCP Solicit, DHCP Advertise, DHCP Request, DHCP Reply messages between AT/PDSN/DHCP) and requests the bootstrap information as described in the stateless process.

In Simple IP version six (SIMPv6) roaming, the IP address may also be obtained pursuant to either a stateless address auto-configuration process or a stateful address configuration process. Both of these processes are similar to those described above with respect to MIPv6, however, no bootstrap information is utilized (O bit not set in the RA) and no information-request or information-reply messages are used.

Both MIP version 4 and SIMP version 4 provide stateful IP address configuration (with MIPv4 using Foreign Agent Care of Address (FCoA)). In the MIPv4 IP address configuration process, the AT 120 sends and agent advertisement to the PDSN 102 and receives back the FCoA information (done in place of the RA, RS process). The bootstrap information is obtained similar to that described above for the MIPv6 IP address configuration process. In the SIMPv4 IP address configuration process, the AT 120 configures its IP address using the DHCP server 120 (DHCP Discover, DHCP Offer, DHCP Request, DHCP Ack messages between AT/PDSN/DHCP), and no bootstrap information is used.

In another authentication process, one authentication protocol (e.g., PAP, CHAP) is used over a PPP link established between the AT 120 and the AN 114 to provide access authentication (not shown) and a different authentication protocol (e.g., EAP) is used over an HRPD connection/session (PPP-free) to provide service authentication. Conversely, in another embodiment, access authorization may be performed using EAP over an HRPD connection/session (PPP-free) while another authentication protocol may be used over a PPP link for service authentication. While these embodiments provide some of the benefits as described herein, these may be less attractive as using EAP over the HRPD connection/session for both access authorization and service authorization.

In one embodiment, the method and system of the present invention is used in accordance with the HRPD. However, the concepts and teachings herein may be utilized with other protocols or specifications.

In some embodiments, some or all of the functions or processes of the one or more of the devices are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for performing an authentication process in a wireless network, the method comprising:
    receiving a wireless connection request from an access terminal;
    establishing a High Rate Packet Data (HRPD) connection between the access terminal and an access network;
    performing access authentication of the access terminal using one or more methods in accordance with Extensible Authentication Protocol (EAP) over the HRPD connection, the performing access authentication comprising:
        sending an EAP request identity message to the access terminal;
        receiving an EAP response identity message from the access terminal; and
        sending information in the received EAP response identity message to an authentication device operable for authenticating the access terminal, the sending the information comprising sending the information to a home authentication device of the access terminal if it is determined that the access terminal is visiting;
    establishing a connection between the access network and a packet data serving node; and
    after access authentication, performing an EAP service authentication process between the packet data serving node and the access terminal over the HRPD connection.

2. The method of claim 1 further comprising:
    establishing a Point-to-Point Protocol (PPP) session over the HRPD connection; and
    performing access authentication over the PPP session.

3. The method of claim 1 further comprising after authenticating the access terminal, sending an EAP success message to the access terminal.

4. The method of claim 1 wherein the sending information to the authentication device comprises sending one or more EAP messages to the authentication device over a RADIUS protocol or a DIAMETER protocol.

5. An access network (AN) in a wireless communications system, the AN comprising:
    means for receiving a wireless connection request from an access terminal;
    means for establishing a High Rate Packet Data (HRPD) connection between the access terminal and an access network;
    means for performing an access authentication process between the access terminal and the access network using one or more methods in accordance with Extensible Authentication Protocol (EAP) over the HRPD connection, the means for performing the access authentication process comprising:
        means for sending an EAP request identity message to the access terminal;

means for receiving an EAP response identity message from the access terminal; and means for sending information in the received EAP response identity message to an authentication device operable for authenticating the access terminal, the means for sending the information comprising means for sending the information to a home authentication device of the access terminal if it is determined that the access terminal is visiting;

means for establishing a connection between the access network and a packet data serving node; and means for performing an EAP service authentication process between the packet data serving node and the access terminal over the HRPD connection.

6. The access network of claim 5, further comprising:

means for establishing a Point-to-Point Protocol (PPP) session over the HRPD connection; and means for performing access authentication over the PPP session.

7. The access network of claim 5, further comprising means for sending an EAP success message to the access terminal after authenticating the access terminal.

8. The access network of claim 5, wherein the means for sending information to the authentication device comprises means for sending one or more EAP messages to the authentication device over a RADIUS protocol or a DIAMETER protocol.

9. A computer readable hardware medium having computer readable program code stored thereon that, when executed, performs a method comprising:

receiving a wireless connection request from an access terminal;

establishing a High Rate Packet Data (HRPD) connection between the access terminal and an access network;

performing an access authentication process between the access network and the access terminal using one or more methods in accordance with Extensible Authentication Protocol (EAP) over the HRPD connection, the performing the access authentication process comprising:

sending an EAP request identity message to the access terminal;

receiving an EAP response identity message from the access terminal; and sending information in the received EAP response identity message to an authentication device operable for authenticating the access terminal, the sending the information comprising sending the information to a home authentication device of the access terminal if it is determined that the access terminal is visiting;

establishing a connection between the access network and a packet data serving node; and after access authentication, performing an EAP service authentication process between the packet data serving node and the access terminal over the HRPD connection.

10. The hardware computer readable medium of claim 9, wherein the computer readable program code, when executed, performs a method further comprising:

establishing a Point-to-Point Protocol (PPP) session over the HRPD connection; and performing access authentication over the PPP session.

11. The hardware computer readable medium of claim 9, wherein the computer readable program code, when executed, performs a method further comprising sending an EAP success message to the access terminal after authenticating the access terminal.

12. The hardware computer readable medium of claim 9, wherein the sending information to the authentication device further comprises sending one or more EAP messages to the authentication device over a RADIUS protocol or a DIAMETER protocol.

13. In a wireless communications system including a supplicant, an authenticator and an authentication device, a method of performing an authentication process in a wireless network comprising:

receiving a wireless connection request from the supplicant;

establishing a High Rate Packet Data (HRPD) connection between the supplicant and the authenticator;

performing one or more access authentication processes between the supplicant and the authenticator using one or more methods in accordance with EAP over HRPD and operable for authenticating the supplicant, the performing comprising:

sending an Extensible Authentication Protocol (EAP) request identity message to the supplicant over HRPD;

receiving an EAP response identity message from the supplicant over HRPD;

sending information in the received EAP response identity message to the authenticator operable for authenticating the supplicant, the sending the information comprising sending the information to a home authenticator of the supplicant if it is determined that the supplicant is visiting;

establishing a connection between the authenticator and a packet data serving node;

after access authentication, performing one or more EAP service authentication processes between the packet data serving node and the supplicant over the HRPD connection; and sending an EAP authentication success message to the supplicant.

14. The wireless communications system of claim 13, wherein the method further comprises:

establishing a Point-to-Point Protocol (PPP) session over the HRPD connection; and performing access authentication over the PPP session.

15. The wireless communications system of claim 13, wherein the method further comprises sending an EAP success message to the supplicant after authenticating the supplicant.

16. The wireless communications system of claim 13, wherein the sending information to the authenticator further comprises sending one or more EAP messages to the authenticator over a RADIUS protocol or a DIAMETER protocol.

\* \* \* \* \*